May 4, 1954 J. A. RYLES 2,677,736

PULSE GENERATOR

Filed March 29, 1952 2 Sheets-Sheet 1

JAMES A. RYLES
INVENTOR

HUEBNER, BEEHLER,
WORREL & HERZIG
ATTORNEYS

BY Richard M. Worrel

JAMES A. RYLES
INVENTOR
HUEBNER, BEEHLER,
WORREL & HERZIG
ATTORNEYS
BY Richard M. Worrel Patented May 4, 1954 2,677,736

UNITED STATES PATENT OFFICE 2,677,736

PULSE GENERATOR

James A. Ryles, Fresno, Calif.

Application March 29, 1952, Serial No. 279,269

15 Claims. (Cl. 200—113)

The present invention relates to pulse generators and more particularly to a thermally actuated pulse generator adapted periodically to interrupt an electrical path therethrough in response to heat incident to electrical transmission and to reestablish the electrical path in response to heat dissipation for the purpose of converting direct current into pulse or alternating current.

The general class of pulse generators to which the instant invention relates is illustrated by United Sates Patent No. 2,485,773 issued October 25, 1949, to me as inventor and to Lewis A. Follansbee, as assignee. For descriptive convenience and purposes of comparison, reference is made herein to the pulse generator shown and described in the designated patent as the comparative form.

The necessity for controlling amperage and voltage ratios in electrical apparatus and the frequency with which only direct current is available where such apparatus is to be operated often requires the conversion of direct current to pulse or alternating current. Obviously, it is desirable that such conversion be accomplished in a dependable manner with a structure that is economical to provide and with as small a power loss as possible. The difficulties incident to such conversion of electrical current were reviewed in part in the above identified patent and are not reiterated at this point. A commercial embodiment of the comparative form of pulse generator obviated or minimized the difficulties noted by its utilization of a pair of spaced electrodes, a closed thin-walled constricted glass tubular member interconnecting the electrodes, a filament of fluid electrical conducting material contained by the tubular member filling the member and interconnecting the electrodes, a closed housing member surrounding the tubular member, and a cushioning and heat dissipating reservoir of gas contained by the housing member in enveloping relation to the tubular member. Experience has proved that whether the difficulties were minimized or obviated, in large measure depended upon the amount of current which the device was called upon to carry. Further, the comparative form has proved subject to certain less grievous, but nevertheless significant, difficulties which the refinements of the present invention have overcome.

For example, while the comparative form is still preferred for low currents of a magnitude of one and a half amperes or less, the pulse generator of the present invention is preferred for higher current levels.

Over long periods of use, the comparative form gradually modifies its operational characteristics. This is believed due to electrical erosion of the constricted portion of the glass tubular member. The present invention overcomes this tendency.

The frequency of the pulse or alternating current of the comparative form under certain conditions is found to vary considerably due to the ambient point of vaporization of the filament. The instant invention localizes the point of vaporization and possesses accurately predictable constant frequency characteristics.

The comparative form was found occasionally to rupture when subject to high current surges during starting operations and generally attained equilibrium of operation only after a considerable operating period. For example, when the comparative form remains connected through a transformer to a storage battery or the like while the battery is completely discharged, the resultant current surges are frequently so strong as to rupture the device. The subject invention is durable under even this condition.

The commercial embodiments of the comparative form which were made of glass usually could not operate successfully below twenty degrees below zero centigrade (—20° C.). The present invention has operated successfully at one hundred degrees below zero centigrade (—100° C.) and probably can operate successfully at even lower temperatures.

Further, considerable skill is required to fabricate the comparative form from glass. The instant form is suited to mass production techniques. Although these difficulties are experienced in the comparative form and reference has been made thereto for descriptive convenience, it is to be borne in mind that the comparative form is preferred for certain specialized civilian and military purposes particularly where only low current requirements are to be met.

An object of the present invention is to provide an improved pulse generator of the character described.

Another object is to provide a thermally actuated pulse generator successfully operable through a wider range of environmental temperatures than heretofore considered practical.

Another object is to provide a thermally actuated pulse generator possessing substantially uniform operational characteristics throughout protracted use.

Another object is to provide a pulse generator of the character described that is not damaged by sudden current surges as frequently encountered in the starting of previous known forms of thermally activated pulse generators.

Another object is to provide a pulse generator of the character described that almost immediately achieves an operational equilibrium upon initial actuation.

Another object is to provide a pulse generator having more uniform operational characteristics than heretofore attained.

Another object is to obviate the variations in frequency and other operational characteristics sometimes encountered in the comparative form incident to the ambient point of vaporization of the filaments utilized therein.

Another object is to provide a pulse generator of the character described suited for operation in low environmental temperatures, even below the freezing points of conducting liquids utilized therein.

Other objects are to provide improved elements and arrangements thereof in a pulse generator of the character described that is economical to produce, adapted to mass production procedures, dependable in operation, and durable.

Further objects and advantages will become apparent in the subsequent description in the specification.

Figure 3:
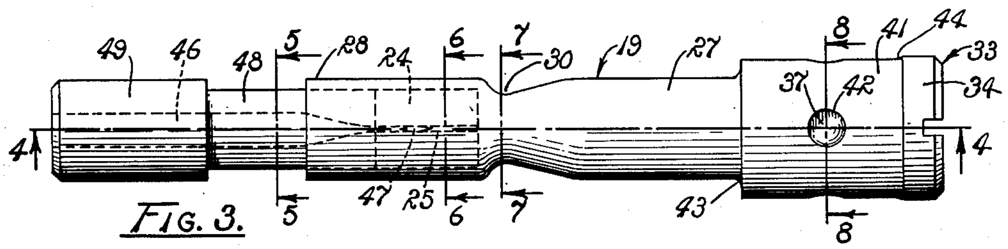
Fig. 3 is a somewhat enlarged side elevation of the pulse generator shown in Fig. 1 as it appears when removed from mounting clamps therefor.
Figure 4:
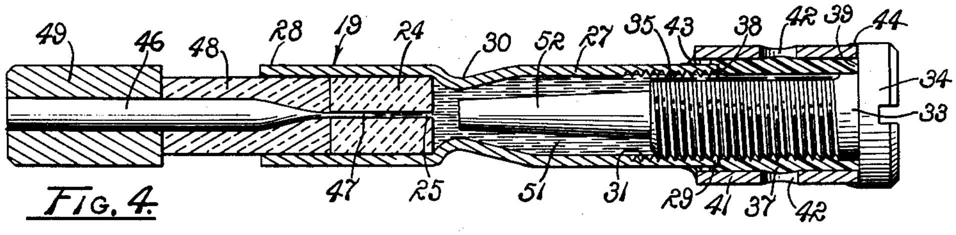
Fig. 4 is a longitudinal section taken on line 4—4 of Fig. 3.
Figure 5:
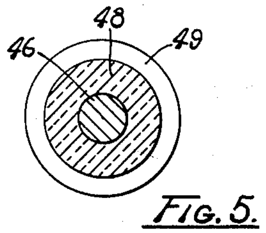
Figure 6:
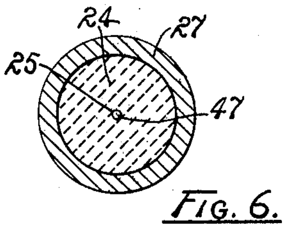
Figure 7:
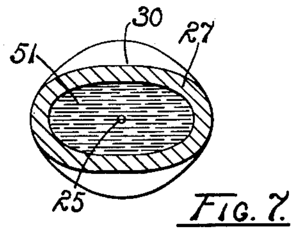
Figure 8:
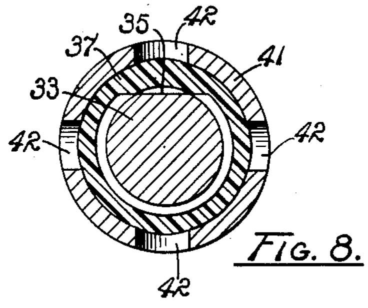

Figs. 5, 6, 7, and 8 are transverse sections taken on lines 5—5, 6—6, 7—7, and 8—8 respectively of Fig. 3.

Figure 9:
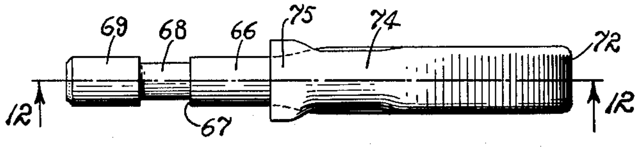

Fig. 9 is a plan view of a second form of the present invention.

Figure 10:
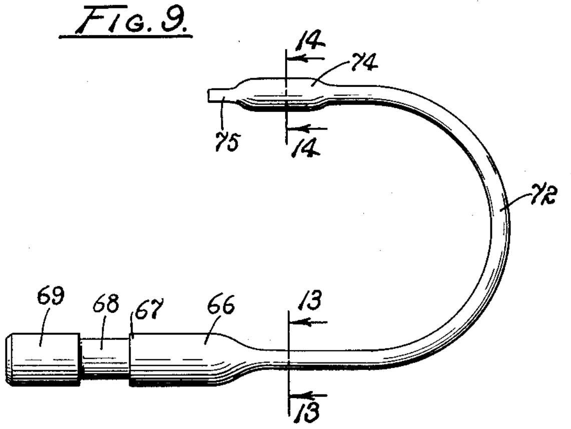

Fig. 10 is a side elevation of the second form.

Figure 11:
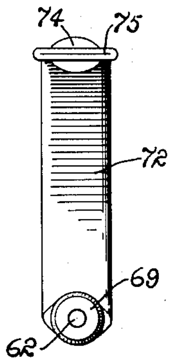

Fig. 11 is an end view of the second form as viewed from the left side of Fig. 10.

Figure 12:
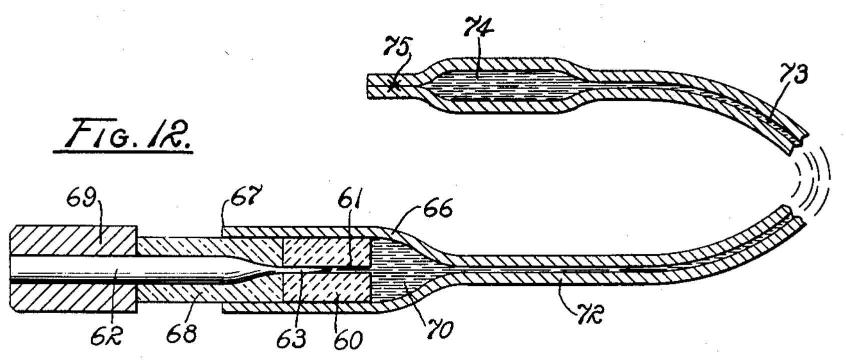

Fig. 12 is a somewhat enlarged longitudinal section of the second form taken on line 12—12 of Fig. 9 and foreshortened for illustrative convenience.

Figure 13:
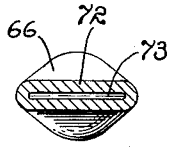

Fig. 13 is a transverse section taken on line 13—13 of Fig. 10.

Figure 14:
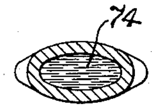

Fig. 14 is a transverse section taken on line 14—14 of Fig. 10.

Figure 1:
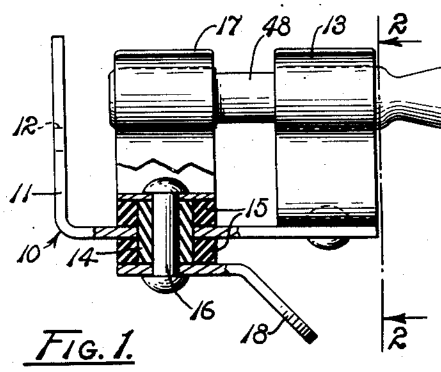
Fig. 1 is a side elevation of a pulse generator embodying the principles of the present invention supported in a mounting structure, shown partially in section, by which an electrical charge is conveniently imposed thereacross.
Figure 2:
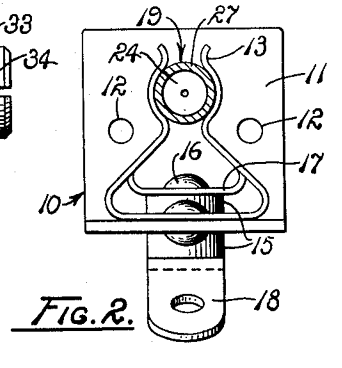
Fig. 2 is a transverse section taken on line 2—2 of Fig. 1.

Referring in greater detail to the drawings:

In Figs. 1 and 2, a mounting structure for the first and second forms of the pulse generator of the present invention is indicated generally at 10. The mounting structure conveniently consists of a generally L-shaped plate 11 having openings 12 formed therethrough by which the plate may be mounted on the dashboard of an automotive vehicle, the cabinet of a radio, or in any other desired operational position. The plate is conveniently of metal and has a spring clip 13 mounted thereon. An insulated plug 14 is mounted in the plate 11 and oppositely extended therefrom. An insulated washer 15 is mounted concentrically on each end of the plug 14 at opposite sides of the plate. A rivet or bolt 16 is extended through the plug and serves to mount a second spring clip 17 in alignment with the first spring clip 13 and electrically to connect a connector 18 electrically to the spring clip 17.

A pulse generator 19 is releasably mounted in the aligned spring clips 13 and 17 in electrical communication therebetween. It will subsequently become apparent that the subjection of the plate 11 and the connector 18 to a difference in electrical potential causes a flow of electrical current through the plate 11, spring clip 13, pulse generator 19, spring clip 17, rivet 16, and connector 18, which are electrically connected in series.

A significant feature of the pulse generator 19 is its employment of a member 24 of dielectric material having a thread-like bore or constricted passage 25 formed therethrough. The member is preferably, although not necessarily, cylindrical in form and has the bore or constricted passage provided in axial relation therein. Glass, porcelain, and other ceramic materials are excellently suited to the purpose as well as many other dielectric materials. Obviously, the diameter of the bore or constricted passage 25 may be predetermined in relation to the desired operating current and frequencies but by way of illustration, a popular design utilizes a bore .010 of an inch in diameter.

A tubular casing 27 is mounted in circumscribing relation on the dielectric member 24 and has ends 28 and 29 oppositely extended therefrom. As an assembling convenience, the casing is slightly compressed, as at 30, intermediate its ends so that the dielectric member can be slid into position therein with the compressed portion aiding in locating the dielectric member. One of the extended ends of the casing is internally screw-threaded, as at 31. Although the casing may be formed from a great variety of electrical conducting materials, the applicant prefers to use metals which are above nickel in the electrostatic table such as cobalt alloys, tantalum, columbium, vanadium, molybdenum, and the like. Alloys of the type described in United States Patent Numbers 2,062,335 and 2,217,421 have been found particularly advantageous in that their coefficients of thermal expansion can easily be balanced with a ceramic material, they resist amalgamation with mercury and other conductive fluids subsequently to be described, and their electrical conducting properties are excellently suited to the purpose.

A plug member 33 is screw-threadedly mounted in the end 29 of the casing and provides an enlarged head 34 in spaced relation to said adjacent end of the casing. The plug member preferably provides a flat 35 longitudinally thereof providing a fluid passage from within the casing to a point intermediate the end 29 of the casing and the head 34. The screw-threads of the plug member provide circumscribing fluid passages about the plug intermediate the casing and the head.

A sleeve 37 of resilient material is fitted over the plug member and has an end 38 compressed in substantially fluid-tight engagement against the end 29 of the casing and an outer end 39 compressed in fluid-tight engagement against the head 34. Although many types of materials can be utilized in forming the sleeve silicone rubber compounds, such as G. E. 81223 of the General Electric Company and equivalents provide excellent characteristics.

A tubular member 41 of metal or other substantially rigid material is fitted over the sleeve 27 and provides diaphragm openings 42 therethrough through which portions of the sleeve are exposed to atmospheric or other environmental pressure. Not infrequently, the flat 35 is omitted from the plug member 33 and the screw-threads on the plug member sufficiently loosely fitted to the screw-threads 31 of the casing that the fluid passage described is provided therebetween. In such event, the tubular member 41 can be utilized in securing the plug in precisely adjusted position by soldering the tubular member to the casing, as at 43, and to the head 34, as at 44. This may readily be accomplished by a simple dipping operation.

An electrode 46 of any suitable electrical conducting material such as the materials described for the casing 27 is mounted in alignment with the bore 25 of the dielectric member 24 at the end of the dielectric member opposite to the plug member 33. The electrode provides a thread-like extension 47 fitted to the bore or constricted passage 25 and terminated at a position intermediate the end portions of the bore. The electrode is sealed in place and leakage from its adjacent end of the bore precluded by a seal 48 bonded to the electrode and to the end 28 of the casing. This is conveniently accomplished in mass production by fitting a cylindrical member of glass, or other material having a suitable melting point and bonding characteristics, over the electrode and sliding the glass into the casing subsequent to which the device is subjected to a temperature sufficient to melt the glass and bond it to the electrode 46 and to the casing 27.

For mounting convenience an annular collar 49 of electrical conducting material having an outside diameter substantially equal to the outside diameter of the casing 27 is mounted on the outer end of the electrode 46 in abutting relation to the seal 48. As shown, the spring clips 13 and 17 are of such size as conveniently to grasp in electrical engagement the collar and casing respectively. A pool of mercury 51, or other suitable liquid having an appropriate temperature of vaporization, fills the bore and the casing intermediate the extended end 47 of the electrode and the plug member 33. To minimize the amount of mercury required, an extension 52 may be provided on the plug member.

*Second form*

The second form of the present invention shown in the second sheet of drawings utilizes a dielectric member 60 similar to the described dielectric member 24 in the first form of the invention and having a bore or constricted passage 61 formed longitudinally therethrough. An electrode 62 is mounted in the dielectric member and has a thread-like extension 63 projected into the bore 61 terminating intermediate opposite ends of the dielectric member. The electrode 62 is similar to the described electrode 46.

A tubular casing 66 of electrical conducting material such as that utilized in forming the casing 27 is fitted tightly over the dielectric member 60 and has an end 67 extended therefrom in spaced circumscribing relation to the electrode 62. A seal 68 of glass or other suitable dielectric material similar to the seal 48 is fitted over the electrode and extended into the end 67 of the casing and is fused to the electrode and to the casing as described in the first form of the invention. A collar 69 of electrical conducting material, similar to the collar 49, is mounted on the extended end of the electrode.

As will subsequently become more clearly apparent, the bore or constricted passage 61 and the casing 66 is filled with a pool of mercury 70 or other liquid electrical conducting material having a suitable vaporization temperature.

It will be observed that except for the casing 66 and the distinctive method of resiliently accommodating thermal expansion and contraction of the mercury pool 70, the second form of the invention is identical to the first form and, of course, includes the significant feature of the electrode extension 63 into electrical contact with the mercury 70 within the bore or constricted passage 61. The casing, however, is flattened as at 72 adjacent to the end of the dielectric member 60 opposite to the electrode 62 similarly to the pinched portion 30 of the casing 27 and aids in mass production of the second form by facilitating positioning of the dielectric member. In the second form, however, the casing is flattened to a greater extent, as evident in Figs. 12 and 13, for considerable length. The flattening is such as to reduce the mercury pool contained therein to a flat ribbon indicated at 73. The flattened portion is longitudinally semi-circularly formed, as shown in Fig. 10, or sharply return bent, if desired, so that the device may be more compact than otherwise would occur. The flattened portion 72 terminates in a chamber 74 also filled with mercury and the end of the tubular casing compressed and sealed as by spot welding at 75.

While the first form of the subject invention resiliently accommodates thermal expansion and contraction of its mercury pool 51 at the diaphragm openings 42, the second form resiliently accommodates such expansion and contraction by the resilience of the flattened portion 72 of the casing 66. As pressure within the casing increases, the flattened portion 72 expands toward a transversely more circular form. As the pressure decreases, the more flattened shape is assumed. By the use of a flattened portion of adequate length, the desired resilient accommodation to expansion and contraction of the mercury pool is attained.

Like the first form, the second form is easily fabricated by mass production methods. It is the usual practice to assemble the dielectric member 60, the casing 66, the electrode 62, the seal 68, and the collar 69 as described for the first form of the invention. The end 75 of the casing 66 is left open and a vacuum applied to the casing. The vacuum is released with the end 75 connected to a source of mercury and thus the casing and the bore or constricted passage 61 are filled with mercury. When it has been determined that substantially all air has been evacuated from the casing and bore and that mercury substantially fills the same, the casing is pinched off and spot welded at 75.

*Operation*

The operation and utility of both forms of the present invention is believed to be clearly apparent and is briefly summarized at this point. The pulse generators are mounted in any suitable mounting structure such as that indicated generally at 10 and a difference in electrical potential is imposed upon the electrode 46 (or 62) and the pool of mercury 51 (or 70) as by the spring clips 13 and 17. It will be apparent that the entire flow of current through the pulse generator must pass through the thread of mercury contained in the bore or constricted passage 25 (or 61) and the extension 47 (or 63) and thus the previously described frequency variations and other changes in operational characteristics incident to ambient points of vaporization are obviated. As the mercury is heated and vaporized in the bore adjacent to the extension, the tubular member 41 where exposed through the diaphragm openings 42 in the first form or the flattened arcuate portion of the casing 66 in the second form resiliently accommodates the expansion of the mercury.

As soon as the flow of current through the filament is interrupted, no further heating thereof occurs and the filament is quickly reestablished by condensation of the vaporized mercury incident to heat dissipation. The successive interruption and reestablishment of the path of electrical current through the pulse generator continues indefinitely as long as an electrical potential between the electrode and mercury pool is maintained in excess of the ability of the filament to conduct the resultant current without vaporization. Although casual inspection might indicate that the resultant pulses of electrical current through the pulse generator would be of relatively low frequency, and certainly low frequencies are easily attained, the applicant has succeeded by utilizing extremely fine mercury filaments in achieving frequencies in excess of 60,000 per minute with even very low current flow.

Although after hundreds of hours of continuous operation, slight erosion of the extended end 47 of the electrode 46 is microscopically detectable, such erosion does not modify the operational characteristics or frequency of the pulse generator. Any such electrode erosion merely causes the point of vaporization within the bore or constricted passage 25 minutely to shift longitudinally of the bore to the extent of such erosion, the diameter of the bore at the point of vaporization remaining constant. This manner of avoiding undesirable changes in operational characteristics during extended use makes possible precise prediction of the operational characteristics in any given electrical, temperature, and pressure environment.

It will be obvious that the successive vaporization and condensation of the mercury and its overall rise in temperature during operation necessitates an adaptation of the means confining the mercury to volumetric changes of the mercury. It has been suggested that air pockets or envelopes of air or other gases be provided within the casing to accommodate mercury expansion and contraction but such has proved unsatisfactory. The coefficients of expansion of gases incident to temperature variation are so much greater than the coefficients of the expansion of the mercury that such pockets preclude continuous uniform operation. The association of the plug member 33, sleeve 37, and tubular member 41 provides an excellent diaphragm which rapidly and with substantially continuously uniform characteristics accommodates the expansion and contraction. Similarly the transverse expansion and contraction of the arcuate casing 66 excellently solves the problem. Further, the employment of the described diaphragm structure permits convenient modification of the pulse generator 19 where relatively increased or decreased resilience is desired. Resilience of accommodation is readily increased by employing tubular members 41 having large diaphragm openings 42 and/or sleeves 37 of greater or lesser thickness and flexibility. Still further, when it is desired that the frequency of operation of the pulse generator be increased or decreased during operation without any appreciable change in current flow through the generator, such variation can readily be attained by placing the tubular member 41 in a closed container, not shown, in which the pressure imposed upon the sleeve 37 through the diaphragm openings 42 can be regulated.

The pulse generators of the present invention are not damaged by starting surges of the type which occasionally rupture the comparative form of pulse generators to which reference has been made. Where commercial forms of the comparative pulse generator have been limited to operation at temperatures above minus twenty degrees contigrade (—20° C.) the subject pulse generators have been started and operated for long periods at temperatures as low as minus one hundred degrees centigratde (—100° C.) and as high as sixty degrees centigrade (60° C.). Further experiments with even wider ranges of environmental temperatures have been limited only by the applicant's test facilities. As in the case of the comparative pulse generator, the pulse generators of the present invention are simply coupled to a transformer where alternate current is desired instead of the pulse current. It will be recalled that when the comparative pulse generator was hooked in series with a transformer and a battery which was permitted completely to discharge therethrough, that the back E. M. F. built up in the transformer frequently rupture such generators. The instant pulse generators are not subject to this difficulty.

The pulse generators of the present invention in addition to being operable in a wide range of environmental temperatures, almost immediately reach a state of operational equilibrium, possess accurately predictable and constant operational characteristics, are of forms suited to mass production techniques and thus are economically produced in large volume. For example, not only does the plug member 33, sleeve 37 and tubular member 41 comprise a superior diaphragm structure which is readily modified and easily produced, but this structure is conducive to rapid filling of the casing and bore with mercury and the complete evacuation of air and the like therefrom. This is accomplished during production by mounting the casing in a substantially erect position after the dielectric member 24, electrode 46 and seal 48 are associated as described, filling the bore and casing with mercury, mounting the sleeve 37 on the plug member 33 and screwing the plug member into the casing until a small amount of mercury is exuded between the casing and sleeve and between the sleeve and the head 34. Although the plug member 33 has been described as being screw-threadedly mounted in the casing, equivalent mounting forms will readily occur to anyone skilled in the art which will provide the mounting convenience, the exuding of air and the like from the casing and that conveniently compresses the sleeve into fluid-tight engagement with the end 29 of the casing and the head 34.

In extensive tests, the pulse generators of the present invention have proved successful in obviating the difficulties encountered in connection with the comparative form and for carrying currents in excess of one and a half (1½)

amperes have proved vastly superior to the comparative forms and all other pulse generators known to the applicant in their durability, stability of operational characteristics, accurate predictability of wave forms and frequencies, and production costs.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention what I claim as new and desire to secure by Letters Patent is:

1. In a pulse generator having a pool of liquid electrical conducting material, a casing confining the pool, and a member of dielectric material mounted in the casing and having a constricted passage formed therethrough admitting the electrical conducting material in a thread-like filament; the improvement which comprises an electrode of solid electrical conducting material extended into the passage and having an inner end terminated within the dielectric member intermediate opposite ends of the passage.

2. In a thermally responsive pulse generator, the combination of a member of dielectric material having a thread-like passage therethrough, a casing mounted in substantially fluid tight engagement on the dielectric member in enclosing relation to an end of the passage, a diaphragm mounted in the casing, an electrode sealed to the dielectric member at the end of the passage opposite to the casing having an extension fitted to the passage and terminating intermediate opposite ends of the passage, and mercury substantially filling the passage and the casing.

3. In a thermally responsive pulse generator having a pool of liquid electrical conducting material, means confining the pool and constricting a portion thereof to a thread-like filament, and means for imparting a difference in electrical potential to opposite ends of the filament whereby it successively vaporizes incident to the heat of electrical conduction therethrough to interrupt said electrical conduction and condenses in response to heat loss to re-establish the electrical conduction; means for accommodating thermal expansion and contraction of the electrically conducting material comprising a plug member mounted in the confining means having an enlarged head in spaced relation to the confining means and being formed with a fluid passage from within the confining means to a position intermediate the head and said confining means, a tubular member of resilient material fitted over the plug member having opposite ends endwardly compressed in substantially fluid tight engagement against the confining means and the head respectively, and a sleeve of substantially rigid material fitted over the tubular member and having a diaphragm opening formed therein.

4. A thermally actuated pulse generator comprising a member of dielectric material having a thread-like passage therethrough, an electrode fitted into the passage having an extended end terminated intermediate opposite ends of the passage, a casing mounted on the dielectric member enclosing the end of the passage opposite to the electrode, said casing having an open extended end, a plug member mounted in the extended end of the casing having an enlarged head in spaced relation to the end of the casing and a groove providing a fluid passage from within the casing to a position intermediate the end of the casing and the head of the plug member, a resilient tubular member mounted in circumscribing relation on the plug having opposite ends compressed in substantially fluid tight engagement against the end of the casing and the head, a sleeve of substantially rigid material fitted in circumscribing relation on the tubular member having a diaphragm opening therein juxtapositioned to the groove of the plug member within the tubular member, and mercury substantially filling the passage of the dielectric member, casing and groove of the plug member.

5. A thermally activated pulse generator comprising a substantially cylindrical member of dielectric material having an axial thread-like passage therethrough, a casing of electrical conducting material mounted in fluid tight circumscribing relation thereon and axially extended therefrom, screw-threaded means mounted in an extended end of the casing and having a head in endwardly spaced relation to said extended end of the casing, the screw-threaded means having a fluid passage formed endwardly along the periphery thereof from an inner end thereof within the casing to a position intermediate the extended end of the casing and the head, a tubular member of flexible material mounted in circumscribing relation on the screw-threaded means having opposite ends compressed in substantially fluid tight engagement against the casing and the head respectively, a sleeve of substantially rigid material mounted in circumscribing relation on the tubular member having a diaphragm opening formed therethrough, an electrode mounted on the end of the dielectric member opposite to the screw-threaded means and having a thread-like extension extended into the passage of said member, a dielectric seal interconnecting the electrode and the dielectric member in substantially fluid tight engagement, and mercury substantially filling the passage of the dielectric member and the casing intermediate the extension of the electrode and the screw-threaded means.

6. A thermally activated pulse generator comprising a substantially cylindrical member of ceramic dielectric material having a thread-like passage endwardly therethrough; a casing of electrical conducting material mounted in circumscribing relation on the dielectric member and having ends oppositely extended therefrom, one of said ends being internally screw-threaded; a screw-threaded plug mounted in the screw-threaded end of the casing having a head in spaced relation to said end of the casing; a tubular member of resilient material fitted over the plug having opposite ends compressed in fluid tight engagement against the adjacent end of the casing and the head, the plug defining a fluid passage between its periphery and the casing and the tubular member from within the casing to a position intermediate the adjacent end thereof and the head of the plug; a sleeve of substantially rigid material mounted in circumscribing relation on the tubular member having a diaphragm opening therein; an electrode mounted in the passage of the dielectric member at the end thereof opposite to the plug having an extension terminating intermediate opposite ends of said passage; mercury filling the passage of the dielectric member and the casing intermediate the plug and the electrode and the fluid passage defined by the plug; and a dielectric seal substantially filling the end of the casing at the end of the dielectric member receiving the electrode and bonded to the casing and to the electrode, the electrode, the dielectric seal and the casing having substantially equal coefficients of expansion.

7. In a thermally responsive pulse generator, the combination of a substantially cylindrical member of dielectric material having a thread-like passage endwardly therethrough; an electrode mounted on an end of the dielectric member in fluid tight engagement therewith having an extension fitted within the passage and terminating intermediate opposite ends of the passage; a tubular casing fitted in fluid tight circumscribing relation on the dielectric member and extended from the end of said member opposite to the electrode, the tubular casing being flattened to a flattened oval cross section endwardly adjacent to the dielectric member and providing a closed extended end portion; and a liquid electrical conducting material filling the passage and the tubular casing.

8. A thermally actuated pulse generator comprising a substantially cylindrical member of dielectric ceramic material having a thread-like passage endwardly therethrough; an electrode extended into the passage having an extended end intermediate opposite ends of the passage; a tubular casing fitted in fluid tight circumscribing relation on the dielectric member and oppositely extended therefrom, the end of the casing extended from the end of the dielectric member opposite to the electrode being flattened to a compressed oval cross-section endwardly adjacent to the dielectric member and providing a closed extended end; a pool of mercury confined by the casing filling the passage in the dielectric member and the casing; a seal of dielectric material substantially filling the end of the casing adjacent to the electrode and bonded to the casing and to the electrode in fluid tight engagement therewith; and means for imparting a difference in electrical potential to the casing and to the electrode.

9. A pulse generator comprising a member of dielectric material defining an elongated thread-like passage therethrough providing opposite open ends, an electrode of solid electrical conducting material mounted on an end of the dielectric member and fitted into the passage of the dielectric member having an inner end within said member, resiliently expansible fluid holding means mounted on the dielectric member at the end of the passage opposite from the electrode and in communication with the passage, and an electrical conducting liquid characterized by vaporization to a substantially non-conducting condition when heated substantially filling the fluid holding means and the remainder of the passage.

10. In a pulse generator having a casing, and a pool of electrical conducting material confined by the casing characterized by vaporization to a substantially non-conducting condition when heated; the combination of a member of dielectrical material defining an elongated thread-like passage therethrough providing opposite open ends, one thereof being in fluid communication with the liquid conducting material and said member confining a minor portion of the liquid in a thread-like filament in the passage, and an electrode of solid electrical conducting material mounted on the dielectric member and extended into the end of the passage opposite to the end in communication with the liquid and engaging the liquid in the passage of said dielectric member.

11. In a device for rapidly and periodically interrupting and re-establishing current flow in an electical circuit, the combination of a member of dielectric material defining an elongated passage therethrough having opposite ends, an electrode of solid electrical conducting material extended into an end of the passage in sealing relation to its respective end of the passage and terminating within the dielectric member, and a liquid electrical conducting material characterized by vaporization to a substantially non-conducting condition when heated engaged with the end of the electrode within the dielectric member and filling the remainder of the passage.

12. In a pulse generator having a pool of liquid electrical conducting material, a casing confining the pool, and a member of dielectric material mounted in the casing and having a constricted passage formed therethrough admitting the electrical conducting material in a thread-like filament; the improvement which comprises an electrode of solid electrical conducting material extended into the passage having an outer end substantially fitted to the passage and being inwardly tapered therefrom providing an inner end terminated within the dielectric member intermediate opposite ends of the passage.

13. A pulse generator comprising a member of dielectric material defining an elongated thread-like passage therethrough providing opposite open ends, an electrode of solid electrical conducting material mounted on an end of the dielectric member and fitted into the passage of the dielectric member having an inner end within said member, said electrode being inwardly tapered within the passage of the dielectric member and the inner end of said electrode being sharply pointed, resiliently expansible fluid holding means mounted on the dielectric member at the end of the passage opposite from the electrode and in communication with the passage, and an electrical conducting liquid characterized by vaporization to a substantially non-conducting condition when heated substantially filling the fluid holding means and the remainder of the passage.

14. In a pulse generator having a casing, and a pool of electrical conducting material confined by the casing characterized by vaporization to a substantially non-conducting condition when heated; the combination of a member of dielectrical material defining an elongated thread-like passage therethrough providing opposite open ends, one thereof being in fluid communication with the liquid conducting material and said member confining a minor portion of the liquid in a thread-like filament in the passage, and an electrode of solid electrical conducting material mounted on the dielectric member and extended into the end of the passage opposite to the end in communication with the liquid and engaging the liquid in the passage of said dielectric member, said electrode being substantially fitted to the passage at the end thereof into which said electrode is extended and being inwardly tapered to a point located intermediate opposite ends of the passage.

15. In a device for rapidly and periodically interrupting and re-establishing current flow in an electrical circuit, the combination of a member of dielectric material defining an elongated passage therethrough having opposite ends, an electrode of solid electrical conducting material extended into an end of the passage in sealing relation to its respective end of the passage and terminating within the dielectric member, said electrode being inwardly tapered within the passage of the dielectric member and providing a pointed terminal end intermediate opposite ends of the passage.

References Cited in the file of this patent

UNITED STATES PATENTS

| Number | Name | Date |
|---|---|---|
| 1,699,769 | Ulrey et al. | Jan. 22, 1929 |
| 2,258,736 | Brian | Oct. 14, 1941 |
| 2,306,728 | Heddaeus | Dec. 29, 1942 |
| 2,449,439 | Wittlinger | Sept. 14, 1948 |